United States Patent
Tsai

Patent Number: 5,309,243
Date of Patent: May 3, 1994

[54] METHOD AND APPARATUS FOR EXTENDING THE DYNAMIC RANGE OF AN ELECTRONIC IMAGING SYSTEM

[75] Inventor: Yusheng T. Tsai, Rochester, N.Y.

[73] Assignee: Eastman Kodak Company, Rochester, N.Y.

[21] Appl. No.: 896,767

[22] Filed: Jun. 10, 1992

[51] Int. Cl.[5] ............ H04N 5/243; H04N 5/232
[52] U.S. Cl. ............................ 348/221; 348/229; 348/362
[58] Field of Search ........... 358/228, 213.19, 213.26, 358/213.17, 213.11, 167; 382/50, 54; H04N 5/232, 5/243

[56] References Cited

U.S. PATENT DOCUMENTS

| | | | |
|---|---|---|---|
| 4,160,277 | 7/1979 | Worsfold | 358/228 |
| 4,408,228 | 10/1983 | Mahony | 358/167 |
| 4,507,681 | 3/1985 | Verhoeven et al. | 358/111 |
| 4,656,514 | 4/1987 | Wilkinson et al. | 358/160 |
| 4,772,117 | 9/1988 | Matsui | 354/402 |
| 4,858,013 | 8/1989 | Matsuda | 358/213.17 |
| 4,873,575 | 10/1989 | De Haan | 358/166 |
| 4,882,628 | 11/1989 | Sugimori et al. | 358/167 |
| 4,887,306 | 12/1989 | Hwang et al. | 382/54 |
| 4,918,528 | 4/1990 | Oohashi et al. | 358/162 |
| 5,101,276 | 3/1992 | Ohta | 358/213.19 |
| 5,164,836 | 11/1992 | Jackson et al. | 358/228 |

FOREIGN PATENT DOCUMENTS 1-226282  9/1989  Japan ............ H04N 5/232

Primary Examiner—Michael T. Razavi
Assistant Examiner—Wendy R. Greening
Attorney, Agent, or Firm—David M. Woods

[57] ABSTRACT

A method and apparatus is disclosed for extending the dynamic range of an electronic imaging system to permit the use of lower cost, lower resolution devices to digitize and process the analog image signal generated by an electronic image sensor. Multiple images captured at different exposure levels are stored in a framestore. An electronic data processing unit then compares the pixels from the image captured at a normal exposure level to preselected exposure ranges to determine if the pixel is underexposed or overexposed. If the pixel is underexposed, the pixel is replaced with a corresponding pixel from an image captured at a higher exposure level. If the pixel is overexposed, the pixel is replaced with a corresponding pixel from an image captured at a lower exposure level. A two level optimization routine is employed, wherein median exposure valves are used to compensate for subject motion.

2 Claims, 2 Drawing Sheets

5,309,243

METHOD AND APPARATUS FOR EXTENDING THE DYNAMIC RANGE OF AN ELECTRONIC IMAGING SYSTEM

BACKGROUND OF THE INVENTION

The invention is generally related to providing automatic exposure correction in electronic imaging systems. The invention is related more specifically to a method and apparatus for extending the dynamic exposure range of electronic imaging systems that utilize electronic image sensor devices to generate image data.

Electronic image sensor devices have been utilized in a wide variety of products including film scanners, motion video cameras and still video cameras, to generate image data. The analog image output signal from the electronic image sensor is typically converted to a digital image signal by an analog-to-digital converter prior to image processing or storage. It has been found that most scenes have a natural scene contrast of about a ten bit dynamic range, thereby requiring the use of standard sixteen bit devices, at a minimum, to perform the digital conversion and signal processing. The expense of electronic imaging systems could be reduced if lower cost eight bit devices could be used to convert and process the image signal.

SUMMARY OF THE INVENTION

The present invention provides a method and apparatus for extending the dynamic range of an electronic imaging system to permit the use of lower cost, lower resolution devices to digitize and process the analog image signal generated by an electronic image sensor.

In a preferred one level optimization embodiment, an electronic imaging system is provided that includes an image generating mechanism that generates a plurality of digitized images at different exposure levels including at least one normal exposure level, one level above the normal exposure level and one level below the normal exposure level, wherein each digitized image includes a plurality of pixels, a framestore for storing the digitized images produced by the image generating mechanism, and an electronic data processing unit for comparing each of the pixels of the digitized image generated at the normal exposure level with a preselected normal exposure range.

In operation, the electronic data processing unit replaces the pixel from the normal exposure level with a corresponding pixel from the digitized image generated at the exposure level above the normal exposure level in a reconstructed image if the pixel from the normal exposure level is underexposed, and replaces the pixel from the normal exposure level with a corresponding pixel from the digitized image generated at the exposure level below the normal exposure level in a reconstructed image if the pixel from the normal exposure level is overexposed.

To compensate for subject motion while obtaining multiple images, a two level optimization embodiment is provided that includes an image generating mechanism for generating a plurality of digitized images including a plurality of pixels at different exposure levels including at least one normal exposure level (N), one level above the normal exposure level (N+1), one level (N+½) equal to the geometric mean between the normal exposure level (N) and the level above the normal exposure level (N+1), one level below the normal exposure level (N−1), one level (N−½) equal to the geometric mean between the normal exposure level (N) and the level below the normal exposure level (N−1), a framestore for storing the digitized images produced by the image unit for comparing each of the pixels of the digitized image generated at the normal exposure level with a preselected normal exposure range to determine if the pixel is underexposed or overexposed.

In operation, the electronic data processing unit replaces the pixel from the normal exposure level (N) with a corresponding pixel from the digitized image generated at the exposure level above the normal exposure level (N+1) in a reconstructed image if the pixel from the normal exposure level (N) is underexposed and the pixel from the digitized image generated at the exposure level above the normal exposure level (N+1) is within a first preselected range; or replaces the pixel from the normal exposure level (N) with a corresponding pixel from the digitized image generated at the exposure level (N+½) equal to the geometric mean between the normal exposure level (N) and the level above the normal exposure level (N+1) in a reconstructed image if the pixel from the exposure level above the normal exposure level (N+1) is outside of the first preselected range and the pixel from the digitized image generated at the exposure level (N+½) equal to the geometric mean between the normal exposure level (N) and the level above the normal exposure level (N+1) is within a second preselected range; or replaces the pixel from the normal exposure level (N) with a corresponding pixel from the digitized image generated at the exposure level below the normal exposure level (N−1) in a reconstructed image if the pixel from the normal exposure level (N) is overexposed and the pixel from the digitized image generated at the exposure level below the normal exposure level (N−1) is within a third preselected range; or replaces the pixel from the normal exposure level (N) with a corresponding pixel from the digitized image generated at the exposure level (N−½) equal to the geometric mean between the normal exposure level (N) and the level below the normal exposure level (N−1) in a reconstructed image if the pixel from the exposure level below the normal exposure level (N−1) is outside of the first preselected range and the pixel from the digitized image generated at the exposure level (N−½) equal to the geometric mean between the normal exposure level (N) and the level below the normal exposure level (N−1) is within a fourth preselected range.

BRIEF DESCRIPTION OF THE DRAWINGS

With the above as background, reference should now be made to the following detailed description of the best modes of carrying out the invention and the accompanying drawings, wherein.

BEST MODES FOR CARRYING OUT THE INVENTION

Figure 1:
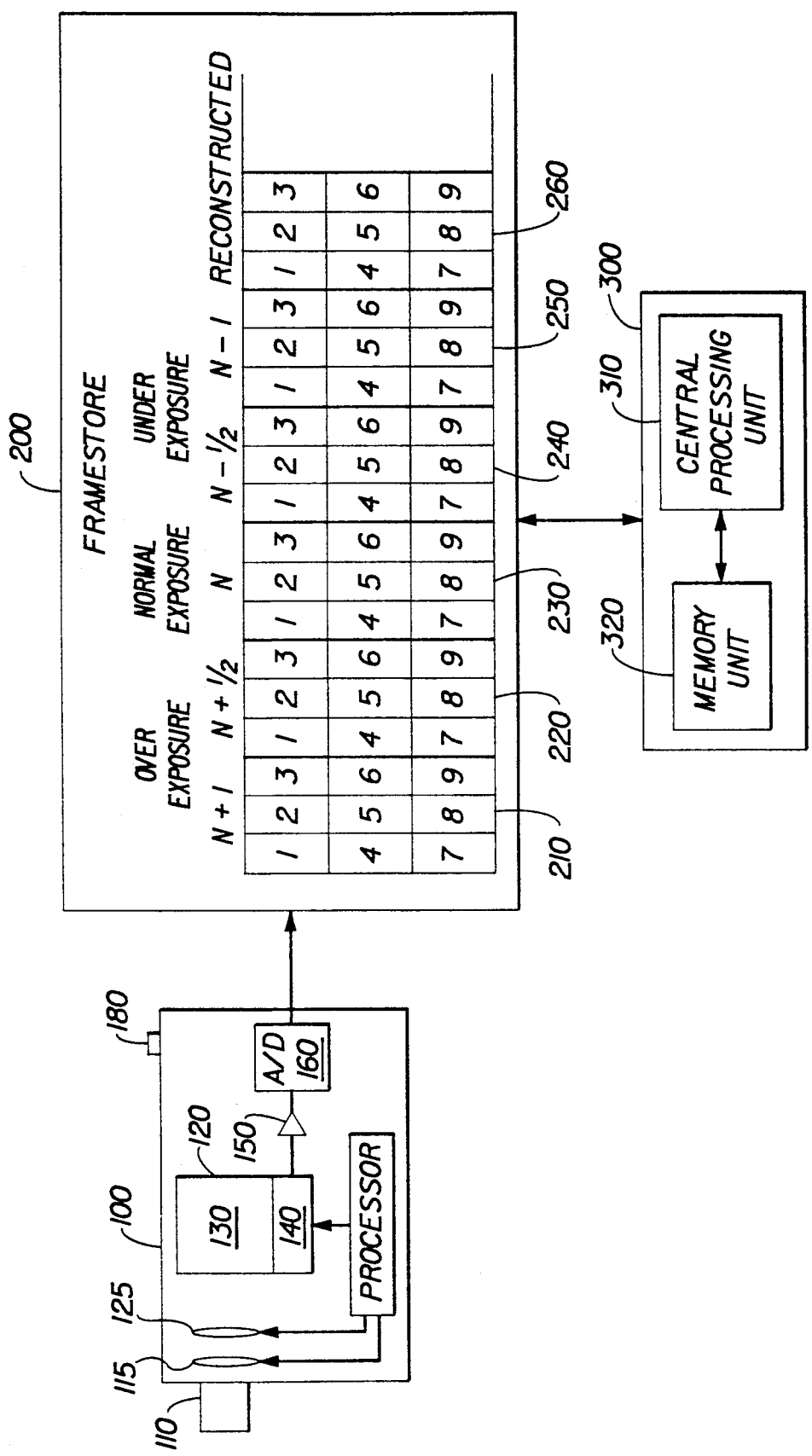
FIG. 1 illustrated an electronic imaging system in accordance with the invention.

The present invention is based on the recognition that data processing techniques can be employed to extend the dynamic range of electronic imaging systems by selecting image pixel data from several images of a scene taken at different exposure levels to reconstruct an optimally exposed image. Since electronic image sensors generally have a linear response to light intensity, images of a scene captured at different exposure levels, for example, N+1, N, and N−1, where N is considered a normal exposure range, N+1 is double the amount of light than at N, and N−1 is half the amount of light at N, can be selectively combined to form an optimally exposed image by comparing the image data generated for each image pixel in the N exposure range image to a selected range to determine whether the pixel is underexposed or overexposed. If the pixel is underexposed with respect to the normal exposure range N, the data for the pixel is replaced with data from the N+1 exposure range image. The data from the N+1 exposure range image is then used in the final reconstructed image. Data from the N−1 exposure range image is similarly used to replace data in the N exposure range image in cases where the N exposure range image is overexposed.

It should be noted that the term "normal exposure range" is intended to refer to any desired exposure range that is considered normal for the particular application. For example, in order to produce special effects, the normal exposure range may be at a level in which the image is intentionally overexposed or underexposed as compared with exposure levels used to produce conventional aesthetically pleasing images.

A simple routine can be implemented using an electronic data processing unit, such as a microprocessor, to create reconstructed pixel data (RP) from original pixel data (OP) following the rules outlined above. For example, assuming a preferred normal exposure range of between 25 and 230 for an eight bit system, the following routine is implemented:

```
IF OP(N) < 25 THEN
    RP = OP(N+1)
ELSE IF OP(n) > 230 then
    RP = OP(N−1)*4
ELSE
    RP = OP(n)*2
```

While the above-described routine may be sufficient in film scanning systems where multiple exposures of a scene can be accomplished without subject movement by scanning a negative at varying exposure levels, problems are encountered when the routine is implemented in electronic cameras that take multiple exposures of an original scene, namely, the data for a specified pixel that is taken from the N+1 exposure range image to replace the data in the N exposure range image may not represent the same portion of the scene being imaged due to subject movement.

The problem of subject movement can be minimized, while maintaining detail in both overexposed and underexposed areas, by utilizing a second level of optimization. In the second level of optimization, the data from the N+1 exposure range image is checked to determine if it properly corresponds to double the N exposure range image data. If it does not, the data from the N+1 exposure range image is replaced with data from an N+½ exposure range image, where N+½ is an exposure range having an amount of light equal to the geometric mean between N and N+1. Similarly, the data from the N−1 exposure range image is checked to see if it properly corresponds to half the N exposure range image data. If it does not, the data from the N−1 exposure range image is replaced with data from an N−½ exposure range image, where N−½ is an exposure range having an amount of light equal to the geometric mean between N and N−1. In both cases, if the data from both exposure ranges (N+1 and N+½) is outside of the proper exposure range, the data from the N exposure range image is used for the final reconstructed image even though the data is not optimal data.

Once again, a simple routine can be implemented using an electronic data processing unit to create reconstructed pixel data (RP) from original pixel data (OP) for each pixel in a reconstructed image following the rules outlined above for two level optimization. Assuming a preferred normal exposure range of between 25 and 230 for an eight bit system, the following routine is implemented:

```
IF OP(N) < 25 THEN
    IF OP(n+1) < 50 THEN
        RP = OP(n+1)
    ELSE IF OP(N+1/2) < 35 THEN
        RP = OP(N+1/2) * 1.414
ELSE IF OP(N) > 230 THEN
    IF OP(N−1) > 115 THEN
        RP = OP(N−1)*4
    ELSE IF OP(N−1/2) > 163 THEN
        RP = OP(N−1/2)*2.828
ELSE
    RP = OP(N)*2
```

Referring now to FIG. 1, an electronic imaging system in accordance with the invention is shown including an electronic camera 100 coupled to a framestore 200, which in turn is coupled to an electronic data processing unit 300. The camera 100 includes a lens system 110 that focuses the scene to be imaged onto an electronic image sensor 120. The electronic image sensor 120 includes an array of pixel elements 130 that generate analog image signals in proportion to the amount of scene radiation incident thereon. The analog image signals generated by the pixel elements 130 are transferred by means of a transfer register 140 to an output amplifier 150 in a conventional manner. The output amplifier 150 is coupled to an analog-to-digital converter 160 that converts the analog image signals to digital image signals. The overall operation of the camera 100 is controlled by a camera control processor 170 in response to an initialization signal received from an operator control 180. The camera control processor 170 controls the exposure of the electronic image sensor 120 by varying the operation of an aperture 115 and shutter 125 provided between the lens 110 and the electronic image sensor 120, by utilizing electronic shuttering techniques in which the integration time of the electronic image sensor 120, or by utilizing a combination of the aperture 115, shutter 125 and electronic shuttering techniques. The framestore 200 has sufficient storage capacity to hold a plurality of images generated by the camera 100. For purposes of illustrating the invention, the framestore 200 is shown divided into five storage sections 210-250 that store images exposed at the N+1, N+½, N, N−1 and N−½ exposure levels discussed above, with each image containing nine pixels (1-9). A sixth section 260 is provided to store the reconstructed image. The electronic data processing unit 300 includes a central processing unit 310 and a memory unit 320 in which an operating program including the above-described two level optimization routine is stored.

In operation, the camera control processor 170, in response to a signal received from the operation control 180, controls the operation of the camera 100 to rapidly capture multiple images of a scene at five different exposure levels N+1, N+½, N, N−1 and N−½. The digital image data corresponding to the image for each exposure range is stored in the framestore 200. Once all images have been stored, the electronic data processing unit 300 implements the two level optimization routine to create a reconstructed optimal image from the five images stored in the framestore 200.

Specifically, the electronic data processing unit 300 retrieves the data for the first pixel of the N exposure range image and compares the data with a preselected normal exposure range (preferably 25<N<230 in an eight bit system). If the data is within the specified range, the electronic data processing unit 300 stores the N data as the first pixel of the reconstructed image in the framestore 200. If, for example, the first pixel is found to be underexposed (N<25), the electronic data processing unit 300 retrieves the data for the first pixel of the N+1 exposure range image and compares the data with a preselected value to determine whether the N+1 data is invalid due to subject motion, i.e., the N+1 data should represent an exposure level of twice the exposure level of the N data, thus the N+1 data must be less that twice the level to which the N data was compared to determine underexposure (N+1<50). If the N+1 data conforms to the specified criteria, the electronic data processing unit 300 stores the N+1 data as the first pixel of the reconstructed image. If the N+1 data does not conform to the specified criteria, it is a clear indication that the data for the first pixel of the N+1 image does not correspond to the data for the first pixel of the N image due to subject motion. In such a case, the electronic data processing unit 300 retrieves the data for the first pixel of the N+½ exposure range image and compares the data with a preselected range (N+½<35). If the N+½ data falls within the specified range, the electronic data processing unit 300 stores the data as the first pixel of the reconstructed image. If the N+½ data does not fall within the specified range, the electronic data processing unit 300 discards the N+½ data and stores the N data as the first pixel of the reconstructed image in the framestore. A similar routine using the data from the N−1 and N−½ exposure range images is implemented if the N data is overexposed (N>230). The process is repeated for each of the pixels in the N exposure range image.

The resulting reconstructing image is therefore composed of pixels from one or more of the originally captured images. Each pixel of the reconstructed image represents the optimum exposure level available from N+1 to N−1. Thus the dynamic range of the electronic imaging system is effectively extended while at the same time permitting lower resolution devices to be employed to perform digitization and image processing.

Figure 2:
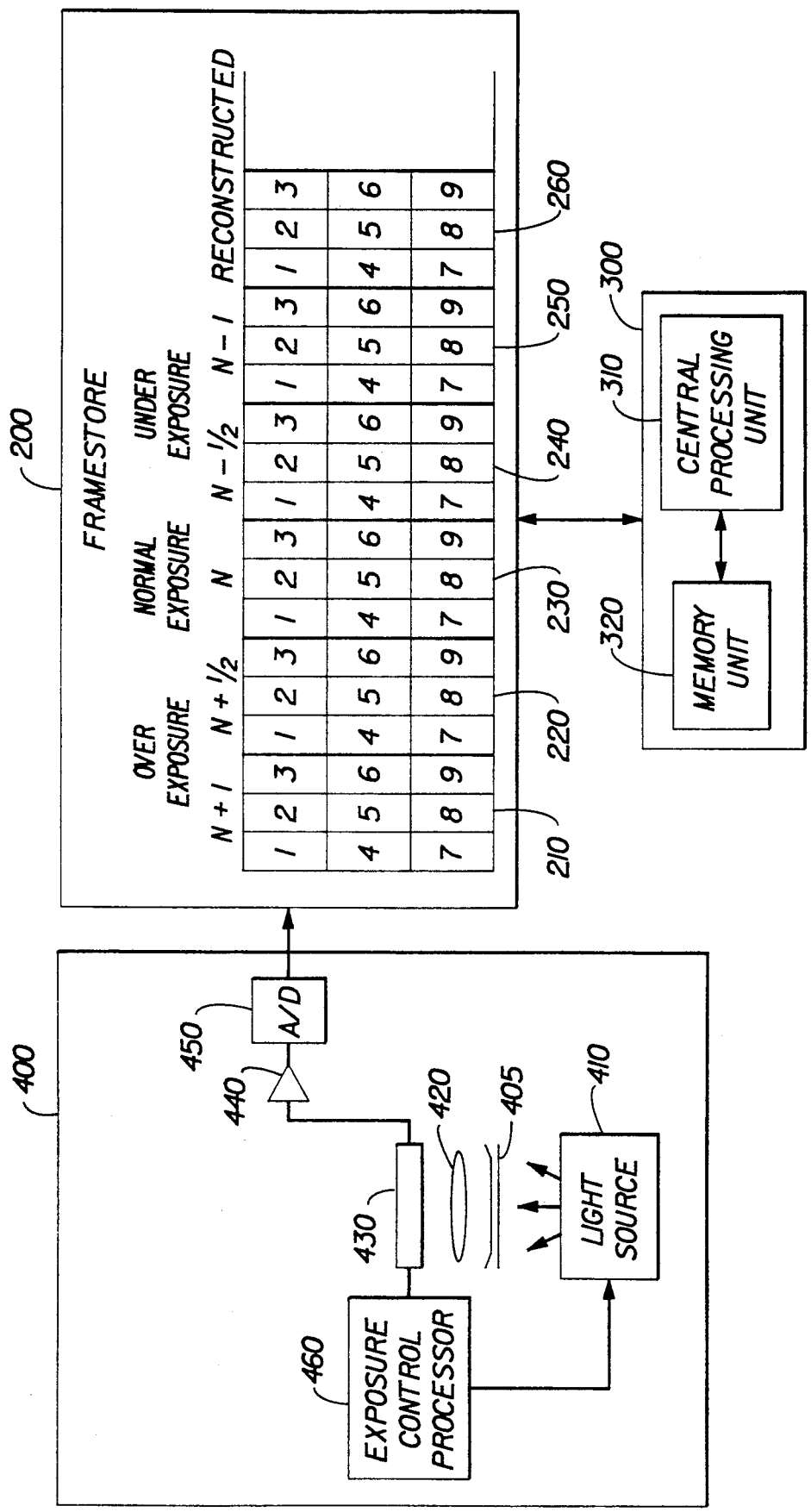
FIG. 2 illustrates a film scanning system in accordance with the present invention.

It should be noted that the invention is applicable to all types of electronic imaging systems including film scanners. FIG. 2, for example, illustrates a film scanner 400 having a film gate 405 in which a negative is located. A variable light source 410 is located on one side of the film gate 400. Light from the light source 410 passes through a negative located in the film gate 400 and is imaged by a lens system 420 onto an electronic image sensor 430. The analog image signal from the electronic image sensor is amplified by an amplifier 440 and then digitized by an A/D converter 450 before being stored in the framestore 200. The operation of the variable light source 410 and the electronic image sensor 430 is controlled by an exposure control processor 460 to produce multiple images at different exposure levels in a manner similar to the camera 100 described above. The image data stored in the framestore 200 is processed by the electronic data processing unit 300 using either the either the single level or two level optimization routines discussed above. In the case of a film scanner, subject motion is not a problem and the single level optimization may prove to be sufficient, although the two level optimization routine will still yield superior results.

The invention has been described with reference to certain preferred embodiments thereof. It will be understood, however, that modifications and variations are possible within the scope of the appended claims. For example, the number of images and exposure ranges can be varied based on the particular application, i.e., the invention is not limited to using a desired exposure level, a level that is double the desired exposure and a level of half the desired exposure level as specifically set forth in the illustrated example. In addition, any desired method of varying the exposure level, including (but not limited to) changing the aperture, shutter speed, focus, optical prefilters, color filters, using different illumination levels, iris/blur control, etc., can be used to generate the images.

What is claimed is:

1. An electronic imaging system comprising:

image generating means for generating a plurality of digitized images including a plurality of pixels at different exposure levels including at least one normal exposure level (N), where N is considered a normal exposure range, one level above the normal exposure level (N+1), one level (N+½) equal to the geometric mean between the normal exposure level (N) and the level above the normal exposure level (N+1), one level below the normal exposure level (N−1), one level (N−½) equal to the geometric mean between the normal exposure level (N) and the level below the normal exposure level (N−1);

a framestore for storing the digitized images produced by the image generating means; and an electronic data processing means for comparing each of the pixels of the digitized image generated at the normal exposure level with a preselected normal exposure range to determine if the pixel is underexposed or overexposed;

wherein the electronic data processing means replaces the pixel from the normal exposure level (N) with a corresponding pixel from the digitized image generated at the exposure level above the normal exposure level (N+1) to create a reconstructed image if the pixel from the normal exposure level (N) is underexposed and the pixel from the digitized image generated at the exposure level above the normal exposure level (N+1) is within a first preselected range;

wherein the electronic data processing means replaces the pixel from the normal exposure level (N) with a corresponding pixel from the digitized image generated at the exposure level (N+½) equal to the geometric mean between the normal exposure level (N) and the level above the normal exposure level (N+1) to create a reconstructed image if the pixel from the exposure level above the normal exposure level (N+1) is outside of the first preselected range and the pixel from the digitized image generated at the exposure level (N+½) equal to the geometric mean between the normal exposure level (N) and the level above the normal exposure level (N+1) is within a second preselected range;

wherein the electronic data processing means replaces the pixel from the normal exposure level (N) with a corresponding pixel from the digitized image generated at the exposure level below the normal exposure level (N−1) to create a reconstructed image if the pixel from the normal exposure level (N) is overexposed and the pixel from the digitized image generated at the exposure level below the normal exposure level (N−1) is within a third preselected range; and wherein the electronic data processing means replaces the pixel from the normal exposure level (N) with a corresponding pixel from the digitized image generated at the exposure level (N−½) equal to the geometric mean between the normal exposure level (N) and the level below the normal exposure level (N−1) to create a reconstructed image if the pixel from the exposure level below the normal exposure level (N−1) is outside of the first preselected range and the pixel from the digitized image generated at the exposure level (N−½) equal to the geometric mean between the normal exposure level (N) and the level below the normal exposure level (N−1) is within a fourth preselected range.

2. A method of extending the dynamic range of an electronic imaging system comprising:

generating a plurality of digitized images including a plurality of pixels at different exposure levels including at least one normal exposure level (N), where N is considered a normal exposure range, one level above the normal exposure level (N+1), one level (N+½) equal to the geometric mean between the normal exposure level (N) and the level above the normal exposure level (N+1), one level below the normal exposure level (N−1), one level (N−½) equal to the geometric mean between the normal exposure level (N) and the level below the normal exposure level (N−1);

storing the digitized images in a framestore;

comparing each of the pixels of the digitized image generated at the normal exposure level with a preselected normal exposure range to determine if the pixel is underexposed or overexposed;

replacing the pixel from the normal exposure level (N) with a corresponding pixel from the digitized image generated at the exposure level above the normal exposure level (N+1) to create a reconstructed image if the pixel from the normal exposure level (N) is underexposed and the pixel from the digitized image generated at the exposure level above the normal exposure level (N+1) is within a first preselected range;

replacing the pixel from the normal exposure level (N) with a corresponding pixel from the digitized image generated at the exposure level (N+½) equal to the geometric mean between the normal exposure level (N) and the level above the normal exposure level (N+1) to create a reconstructed image if the pixel from the exposure level above the normal exposure level (N+1) is outside of the first preselected range and the pixel from the digitized image generated at the exposure level (N+½) equal to the geometric mean between the normal exposure level (N) and the level above the normal exposure level (N+1) is within a second preselected range;

replacing the pixel from the normal exposure level (N) with a corresponding pixel from the digitized image generated at the exposure level below the normal exposure level (N−1) to create a reconstructed image if the pixel from the normal exposure level (N) is overexposed and the pixel from the digitized image generated at the exposure level below the normal exposure level (N−1) is within a third preselected range; and replacing the pixel from the normal exposure level (N) with a corresponding pixel from the digitized image generated at the exposure level (N−½) equal to the geometric mean between the normal exposure level (N) and the level below the normal exposure level (N−1) to create a reconstructed image if the pixel from the exposure level below the normal exposure level (N−1) is outside of the first preselected range and the pixel from the digitized image generated at the exposure level (N−½) equal to the geometric mean between the normal exposure level (N) and the level below the normal exposure level (N−1) is within a fourth preselected range.

* * * * *